US009948714B2

(12) United States Patent
Fletcher et al.

(10) Patent No.: US 9,948,714 B2
(45) Date of Patent: *Apr. 17, 2018

(54) ASSIGNING A DATA ITEM TO A STORAGE LOCATION IN A COMPUTING ENVIRONMENT

(71) Applicant: International Business Machines Corporation, Armonk, NY (US)

(72) Inventors: James C. Fletcher, Apex, NC (US); David P. Johnson, Cary, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/131,290

(22) Filed: Apr. 18, 2016

(65) Prior Publication Data

US 2016/0234310 A1    Aug. 11, 2016

Related U.S. Application Data

(63) Continuation of application No. 13/417,087, filed on Mar. 9, 2012, now Pat. No. 9,349,024, which is a
(Continued)

(51) Int. Cl.
*G06F 15/16*    (2006.01)
*H04L 29/08*    (2006.01)
(Continued)

(52) U.S. Cl.
CPC ...... *H04L 67/1097* (2013.01); *G06F 12/0868* (2013.01); *G06F 21/6245* (2013.01);
(Continued)

(58) Field of Classification Search
CPC ............. G06F 11/1008; G06F 11/1044; G06F 11/1068; G06F 11/1072; G06F 12/0802; G06F 12/0866; G06F 12/0868; G06F 5/06
See application file for complete search history.

(56) References Cited

U.S. PATENT DOCUMENTS 7,379,960 B2    5/2008    Dimitroff et al.
7,502,890 B2 *  3/2009    Kailas ................... G06F 12/126
                                                         711/133
(Continued)

FOREIGN PATENT DOCUMENTS

WO    2006071560 A2    7/2006
WO    2006090367 A2    8/2006
WO    2008040082 A1    4/2008

OTHER PUBLICATIONS

U.S. Appl. No. 13/008,142 Decision on Appeal dated Jun. 17, 2016.
(Continued)

*Primary Examiner* — Dhairya A Patel
(74) *Attorney, Agent, or Firm* — Yee & Associates, P.C.; Maeve M. Carpenter

(57) ABSTRACT

The computer detects a request from a first computer to store a data item, and determines if a volatile memory in a second computer comports with an isolation rule for the data item. In response to determining that the volatile memory in the second computer comports with the isolation rule for the data item, the computer compares access time for data in the volatile memory in the second computer with access time for data in a local hard drive in the first computer, and then selectively stores the data item in a storage location that has a lower access time. The computer establishes a threshold resource consumption rate for both the volatile memory in the second computer and the local hard drive in the first computer to further select the volatile memory in the second
(Continued)

computer or the local hard drive in the first computer to store the data item.

8 Claims, 4 Drawing Sheets

Related U.S. Application Data continuation of application No. 13/008,142, filed on Jan. 18, 2011, now abandoned.

(51) Int. Cl.
  *G06F 12/0868* (2016.01)
  *G06F 21/62* (2013.01)
  *G06F 12/0866* (2016.01)

(52) U.S. Cl.
  CPC .......... *H04L 67/16* (2013.01); *G06F 12/0866* (2013.01); *H04L 67/2842* (2013.01)

(56) References Cited

U.S. PATENT DOCUMENTS

| | | | |
|---|---|---|---|
| 7,536,373 B2 | 5/2009 | Kelkar et al. | |
| 7,552,276 B2 | 6/2009 | Allison et al. | |
| 8,990,402 B2* | 3/2015 | Taylor | H04L 51/30 709/206 |
| 2005/0071599 A1* | 3/2005 | Modha | G06F 9/5016 711/170 |
| 2005/0172074 A1* | 8/2005 | Sinclair | G06F 1/3268 711/114 |
| 2006/0090031 A1* | 4/2006 | Kirshenbaum | G06F 12/0866 711/113 |
| 2007/0094444 A1* | 4/2007 | Sutardja | G06F 1/3203 711/112 |
| 2007/0152076 A1* | 7/2007 | Chiang | F25D 29/00 236/94 |
| 2008/0244031 A1* | 10/2008 | Rai | H04L 12/66 709/213 |
| 2009/0144516 A1 | 6/2009 | Sandorfi | |
| 2009/0150511 A1 | 6/2009 | Gross et al. | |
| 2012/0185642 A1 | 7/2012 | Fletcher et al. | |
| 2014/0195480 A1* | 7/2014 | Talagala | G06F 12/0804 707/610 |

OTHER PUBLICATIONS

P. Mell et al., "The NIST Definition of Cloud Computing", National Institute of Standards and Technology, Information Technology Laboratory, Sep. 2011, pp. 1-7.
K. Li, "Shared Virtual Memory on Loosely Coupled Multiprocessors", Dissertation, Yale Univ., New Haven, CT, Jan. 1, 1986, pp. 1-213 (Abstract Only).
Heo, J. et al, "Memory Overbooking and Dynamic Control of Xen Virtual Machines in Consolidated Environments", 2009 IFIP/IEEE International Symposium on Integrated Network Management, IEEE 2009, pp. 630-637.
"Cloud Computing" http://en.wikipedia.org/wiki/Cloud_computing.
U.S. Appl. No. 13/008,142—Examiner's Answer dated Feb. 28, 2014.
U.S. Appl. No. 13/008,142—Final Office Action dated Aug. 1, 2013.
U.S. Appl. No. 13/008,142—Non-Final Office Action dated Feb. 15, 2013.
U.S. Appl. No. 13/008,142—Non-Final Office Action dated Aug. 31, 2012.
J. Rittinghouse et al., "Cloud Computing Implementation, Management, and Security," CRC Press, Taylor & Francis Group, Boca Raton, Florida, 2010, p. 253.
U.S. Appl. No. 13/417,087—Non-Final Office Action dated Jul. 7, 2015.
U.S. Appl. No. 13/417,087—Notice of Allowance dated Mar. 2, 2016.

* cited by examiner

ASSIGNING A DATA ITEM TO A STORAGE LOCATION IN A COMPUTING ENVIRONMENT

BACKGROUND

The present disclosure relates to the field of computers, and specifically to the use of computers to store data. Still more particularly, the present disclosure relates to the use of computers in enabling access to various storage devices across a distributed computing environment, such as a cloud.

Cloud computing is Internet-based computing, whereby shared resources, software and information are provided to computers and other devices on-demand, similar to a public utility such as the electricity grid. Details are abstracted from the users who no longer have need of, expertise in, or control over the technology infrastructure "in the cloud" that supports them. Cloud computing describes a supplement, consumption and delivery model for IT services based on the Internet, and typically involves the provision of dynamically scalable and often virtualized resources as a service over the Internet.

SUMMARY

In an embodiment of the present invention, a computer system includes one or more processors, one or more computer readable memories, one or more computer readable storage mediums, and program instructions stored on at least one of the one or more storage mediums for execution by at least one of the one or more processors via at least one of the one or more memories. The stored program instructions include: program instructions to detect a request from a first computer to store a data item; program instructions to determine if a volatile memory in a second computer comports with an isolation rule for the data item, wherein the isolation rule prohibits sensitive data from two companies co-residing on the volatile memory, wherein comporting with the isolation rule permits the data item to be stored in the volatile memory in the second computer; program instructions to, in response to determining that the volatile memory in the second computer comports with the isolation rule for the data item, compare access time for data in the volatile memory in the second computer with access time for data in a local hard drive in the first computer; program instructions to selectively store the data item in a storage location that has a lower access time, wherein the storage location is either the volatile memory in the second computer or the local hard drive in the first computer as determined by the lower access time; program instructions to establish a threshold resource consumption rate for both the volatile memory in the second computer and the local hard drive in the first computer, wherein the threshold resource consumption rate sets a maximum permissible level of ancillary resources used to access the volatile memory in the second computer or the local hard drive in the first computer; program instructions to further select the volatile memory in the second computer or the local hard drive in the first computer to store the data item according to whether the volatile memory in the second computer or the local hard drive in the first computer has a lower threshold resource consumption rate relative to one another; and program instructions to, in response to determining that a volatile memory in a third computer has a lower access time than the volatile memory in the second computer or the local hard drive in the first computer, move the data item from the volatile memory in the second computer to the volatile memory in the third computer.

In an embodiment of the present invention, a computer system includes one or more processors, one or more computer readable memories, one or more computer readable storage mediums, and program instructions stored on at least one of the one or more storage mediums for execution by at least one of the one or more processors via at least one of the one or more memories. The stored program instructions include: program instructions to detect a request from a first computer to store a data item; program instructions to determine if a volatile memory in a second computer comports with an isolation rule for the data item, wherein the isolation rule prohibits sensitive data from two companies co-residing on the volatile memory, wherein comporting with the isolation rule permits the data item to be stored in the volatile memory in the second computer; program instructions to determine that the volatile memory in the second computer does not comport with the isolation rule due to incompatible data being stored in the volatile memory in the second computer, wherein the incompatible data is sensitive data from two different companies; program instructions to determine that the data item has a higher priority for being accessed by the first computer than the incompatible data that is currently stored in the volatile memory in the second computer; program instructions to move the incompatible data to a hard drive on the second computer and storing the data item in the volatile memory in the second computer; program instructions to selectively store the data item in a storage location that has a lower access time, wherein the storage location is either the volatile memory in the second computer or the local hard drive in the first computer as determined by the lower access time; program instructions to establish a threshold resource consumption rate for both the volatile memory in the second computer and the local hard drive in the first computer, wherein the threshold resource consumption rate sets a maximum permissible level of ancillary resources used to access the volatile memory in the second computer or the local hard drive in the first computer; program instructions to further select the volatile memory in the second computer or the local hard drive in the first computer to store the data item according to whether the volatile memory in the second computer or the local hard drive in the first computer has a lower threshold resource consumption rate relative to one another; and program instructions to, in response to determining that a volatile memory in a third computer has a lower access time than the volatile memory in the second computer or the local hard drive in the first computer, move the data item from the volatile memory in the second computer to the volatile memory in the third computer.

In an embodiment of the present invention, a computer system includes one or more processors, one or more computer readable memories, one or more computer readable storage mediums, and program instructions stored on at least one of the one or more storage mediums for execution by at least one of the one or more processors via at least one of the one or more memories. The stored program instructions include: program instructions to detect a request from a first computer to store a data item; program instructions to determine if a volatile memory in a second computer comports with an isolation rule for the data item, wherein the isolation rule prohibits sensitive data from two companies co-residing on the volatile memory, wherein comporting with the isolation rule permits the data item to be stored in the volatile memory in the second computer; program instructions to, in response to determining that the volatile memory in the second computer comports with the isolation rule for the data item, compare access time for data in the volatile memory in the second computer with access time for data in a local hard drive in the first computer; program instructions to selectively store the data item in a storage location that has a lower access time, wherein the storage location is either the volatile memory in the second computer or the local hard drive in the first computer as determined by the lower access time; program instructions to establish a threshold resource consumption rate for both the volatile memory in the second computer and the local hard drive in the first computer, wherein the threshold resource consumption rate sets a maximum permissible level of ancillary resources used to access the volatile memory in the second computer or the local hard drive in the first computer; and program instructions to further select the volatile memory in the second computer or the local hard drive in the first computer to store the data item according to whether the volatile memory in the second computer or the local hard drive in the first computer has a lower threshold resource consumption rate relative to one another, wherein the volatile memory in the second computer requires transport overhead associated with using a network channel to transport the data item from the first computer and the second computer, wherein the local hard drive requires only local bus overhead associated with using a local bus in the first computer to store the data item on the local hard drive, and wherein the transport overhead is greater than the local bus overhead.

DETAILED DESCRIPTION

Figure 1:
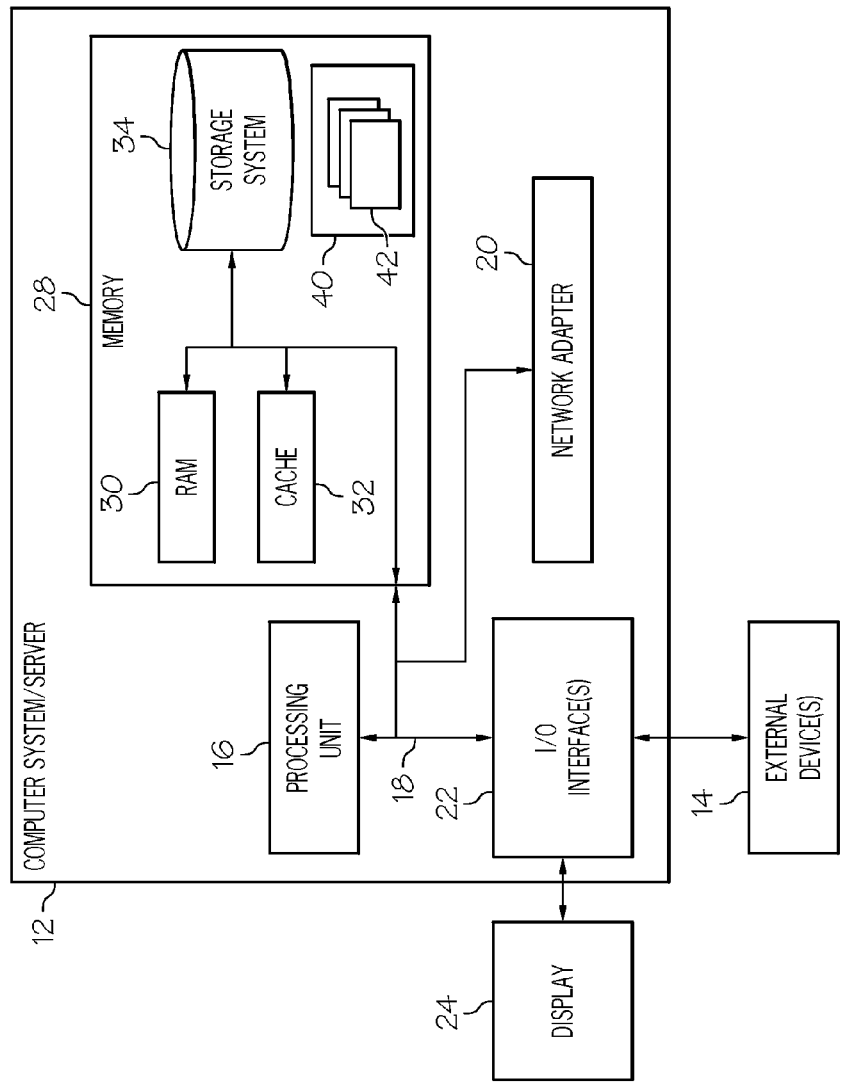
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from "The NIST Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 comprises a variety of computer system readable media. Such media may be any available media that is accessible by computer system/server 12, and it includes both volatile and non-volatile media, removable and non-removable media.

In one embodiment, system memory 28 comprises computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Figure 4:
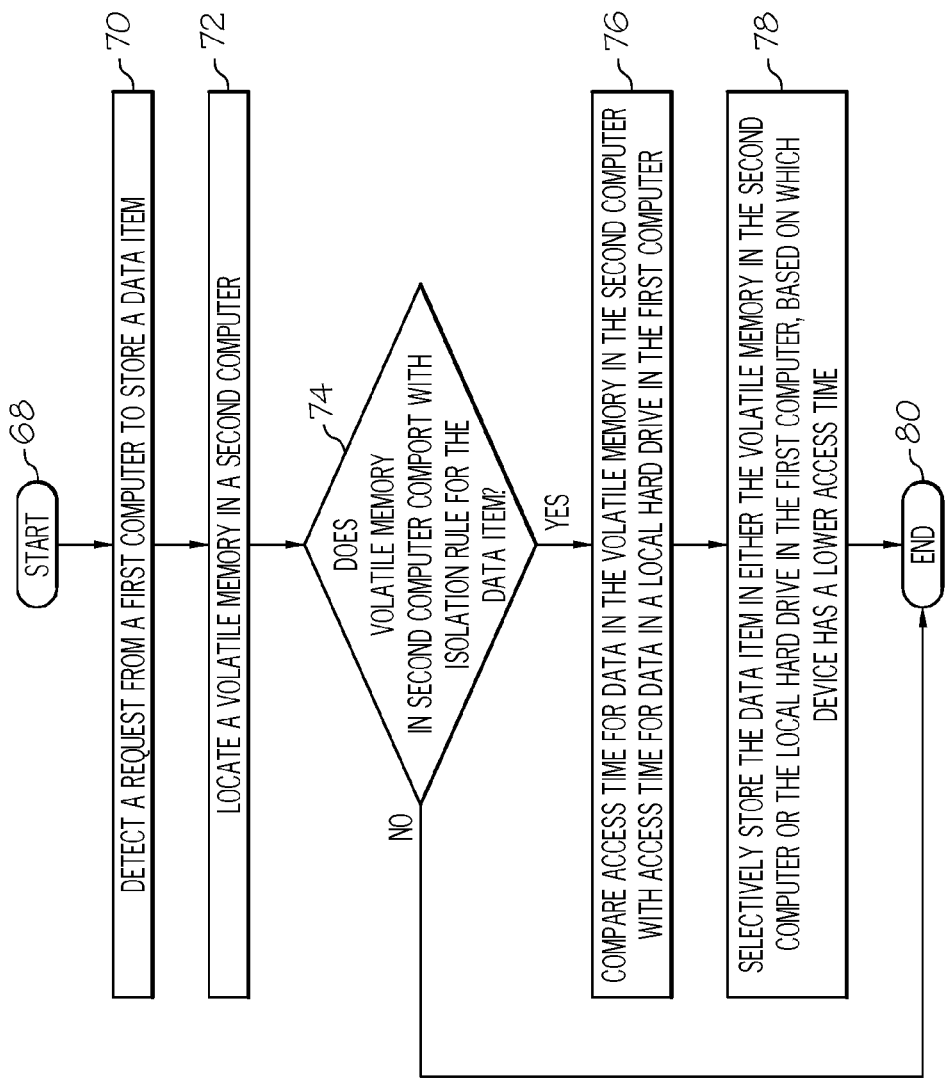
FIG. 4 is a high level flow chart of one or more exemplary steps taken by a processor to assign data items to storage locations, including storage locations within a cloud computing environment.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 comprise computer program instructions that are stored in memory 28 and/or storage system 34. These computer program instructions, when executed in processing units 16 via system memory 28, generally carry out the functions and/or methodologies of embodiments of the invention as described herein, including, but not limited to, those functions described in FIG. 4.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
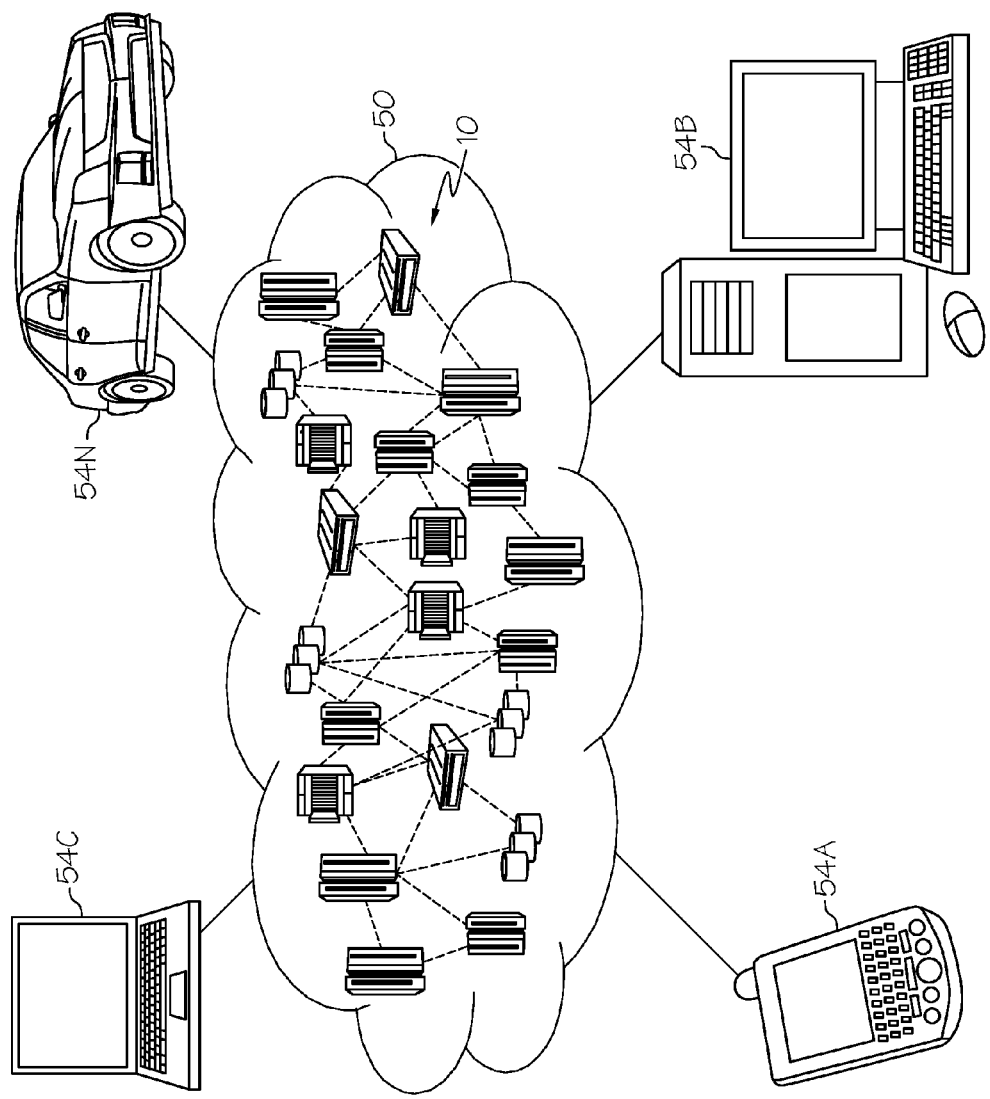
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
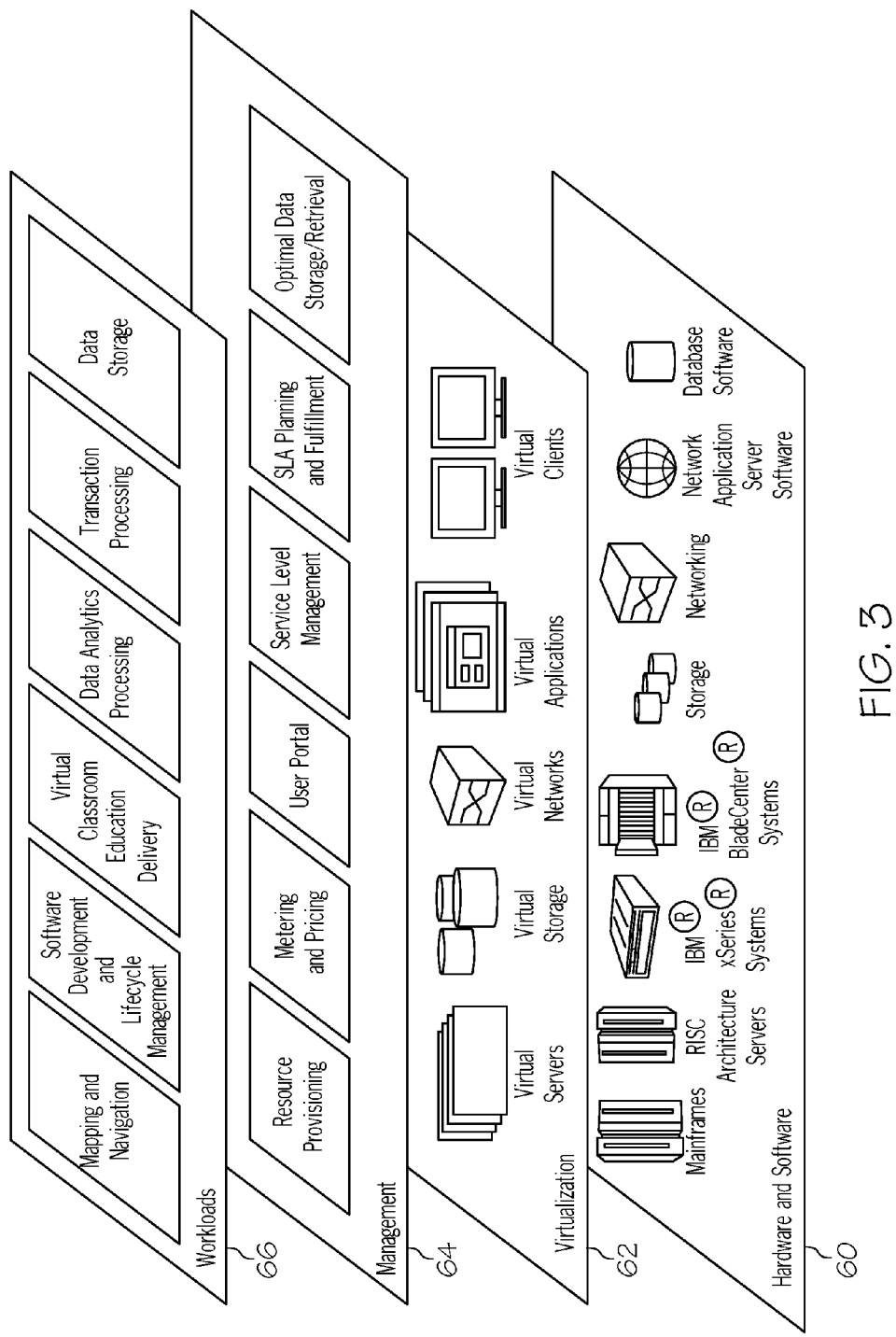
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Optimal Data Storage/Retrieval provides for optimal storage and retrieval of data in local and/or remote devices in accordance with isolation parameters described herein.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data storage (particularly as described herein).

With reference again to management layer 64 and/or workloads layer 66, the present disclosure describes a process for assigning a data item to a storage location, which in one embodiment is within a cloud computing environment. Thus, referring to FIG. 4, a high level flow chart of performing this process is presented. After initiator block 68, a request from a first computer to store a data item is detected (block 70). This detection may be made by a processor in a controller computer that is coupled to the first computer, the first computer itself, or a second computer (described below). The first computer, the second computer, and/or the controller computer, each of which may utilize the architecture shown in FIG. 1 for computer system/server 12, are coupled together, through a network, which may be a cloud system.

As described in block 72, volatile memory in a second computer is then located (e.g., identified by the controller computer). This second computer has volatile memory, which may be shared with other computers, assuming that there are no rules/policies prohibiting such sharing. Thus, before sharing its volatile memory with other computers, a determination is made as to whether the volatile memory in the second computer comports with an isolation rule for the data item (query block 74). That is, comporting with the isolation rule permits the data item to be stored in the volatile memory in the second computer.

Isolation rules may be controlled by isolation policies, set by a cloud administrator, enterprise, information technology manager, hardware configurations, etc., in order to ensure that data are not co-mingled inappropriately. Although system memory, such as RAM, is suppose to be isolated, leaks can still occur. To enforce such isolation rules, policies can be expressed in a policy language, such as eXtensible Access Control Markup Language (XACML). Such policies express intents such as: "data from company A cannot co-reside with data from any other company"; "sensitive data from company A cannot co-reside with data from any other company"; "sensitive data from company A cannot co-reside with any other data", etc. By applying such isolation rules/policies, access control is ensured, such that only authorized users and/or applications can access data.

Returning to query block 74, if the volatile memory in the second computer does comport with the isolation rule for the data item, then access time for data in the volatile memory in the second computer is compared with access time for data in a local hard drive in the first computer (block 76), in order to establish optimality (i.e., whether the local hard drive or the remote volatile memory should be used to store the data item). In one embodiment, the hard drive is physically located within the first computer, while in another embodiment the hard drive is coupled (e.g., via a storage area network—SAN) to the hard drive. In either embodiment, there are two types of optimality contemplated herein: response time and resource consumption.

Response time is a function both of static and dynamic conditions. Static conditions define the speed at which data can move through an unloaded system; dynamic conditions take into account current (or expected) load. To compute optimal response time, the system determines the speed at which the data item can move from the storage location to local RAM. In a simple example, only static conditions are considered, although dynamic conditions can also be considered. That is, conditions can change over time, thus making them dynamic. For example, data which might cause a security-policy conflict might belong to a job that completes, thus allowing for data to be moved. In another example, higher performing storage might become less loaded over time. Optionally, the system can re-evaluate optimality and policy compliance and relocate data.

Resource consumption considers how much resource it takes to store and make available the data item. For example, if many data items are moved to remote RAM (e.g., volatile memory in the second computer), then the network overhead of moving those data items can decrease (or even eliminate) the performance benefit of using a local hard drive. Note that additional efficiencies can be created by ensure that referential data are stored and retrieved together—that is, if one block of data (e.g., a matrix column) is often accessed with a second block, then the two related blocks are retrieved together. Thus, response time and resource consumption conditions can be combined linearly or in any weighted form.

Continuing with the comparison described in block 76, in one embodiment a threshold resource consumption rate is established for both the volatile memory in the second computer and the local hard drive in the first computer. This threshold resource consumption rate sets a maximum permissible level of ancillary resources used to access the volatile memory in the second computer or the local hard drive in the first computer. That is, certain devices (e.g., volatile memory in the remote second computer) may require more overhead associated with using a network channel, input/output ports, etc., while another device (e.g., a local hard drive) may require only a local bus. For example, a local hard drive requires only the hard drive space, while the remote system memory in the second computer also requires network traffic. Thus, in one embodiment a determination is made not only as to whether the volatile memory in the remote second computer is qualified to store the data item (i.e., it comports with the isolation rule/policy), but consideration is also given to what overhead would be incurred to support the use of that remote volatile memory. Thus, a selection is made of the volatile memory in the second computer or the local hard drive in the first computer to store the data item according to whether the volatile memory in the second computer or the local hard drive in the first computer has a lower threshold resource consumption rate relative to one another. In one embodiment, this threshold resource consumption rate is dynamically adjusted according to a higher fee associated with the ancillary resources associated with either the volatile memory in the second computer or the local hard drive in the first computer. That is, even if one of the devices (e.g., the volatile memory in the remote second computer) has more overhead associated with it, if it is nonetheless still cheaper to utilize, then it will be used.

Furthermore, some jobs will be considered higher priority than others. In a cloud environment, that may result from one party paying a higher fee to have the work completed. In such cases, it is beneficial to assign a different threshold for resource consumption. In such cases, the system can maximize response time while staying under a threshold for resource consumption.

Returning again to FIG. 4, the data item is selectively stored in either the volatile memory in the second computer or the local hard drive in the first computer, depending on which device has the lower access time, as described in block 78. Alternatively, other parameters, such as cost, overhead, etc. described herein, may outweigh and/or augment this factor. That is, data items are placed by considering both the isolation policies and the resource constraints described above. In one embodiment, the system (e.g., the controller/management computer) computes the data placement that satisfies all isolation policies and maintains resource consumption under the given threshold, then optimizes response time. The policies and resource consumption thresholds serve as constraints on the solution to the response time problem.

The data can later be moved. For example, in some cases, a better solution can be obtained by moving data from other jobs from its current location to other locations. In such cases, the computations disclosed above are followed, with the additional factor of considering moving other data to obtain a global optima. Policies can be set to limit the amount of data that can be moved. These policies can also apply specifically to data associated with high-priority and time-sensitive jobs, as well as the costs of moving such data.

The process ends at terminator block 80.

Returning to block 76, in one embodiment a determination may be made that a volatile memory in a third computer has a lower access time than the volatile memory in the second computer or the local hard drive in the first computer. If the data item had been previously stored in the volatile memory in the second computer, then the data item is moved from the volatile memory in the second computer to the volatile memory in the third computer.

Returning to query block 74, in some cases the volatile memory in the second computer will NOT comport with the isolation rule/policy due to other incompatible data being stored in the volatile memory in the second computer. In this scenario, a determination is made that the data item has a higher priority for being accessed by the first computer than the incompatible data that is currently stored in the volatile memory in the second computer. As such, the incompatible data is moved to a hard drive on the second computer (evicted from the volatile memory in the second computer), and the new and higher priority data item is stored in the volatile memory in the second computer.

Thus, disclosed herein in one embodiment is a method of assigning data blocks to storage locations such that the placement respects isolation policies, and then optimizes resource use. By sharing RAM, efficiencies are gained while the overall system still respects isolation objectives, resulting in an optimal placement for a data while also respecting isolation policies.

As reflected above, it will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to detect a request from a first computer to store a data item;

program instructions to determine if a volatile memory in a second computer comports with an isolation rule for the data item, wherein the isolation rule prohibits sensitive data from two companies co-residing on the volatile memory, wherein comporting with the isolation rule permits the data item to be stored in the volatile memory in the second computer;

program instructions to, in response to determining that the volatile memory in the second computer comports with the isolation rule for the data item, compare access time for data in the volatile memory in the second computer with access time for data in a local hard drive in the first computer;

program instructions to selectively store the data item in a storage location that has a lower access time, wherein the storage location is either the volatile memory in the second computer or the local hard drive in the first computer as determined by the lower access time;

program instructions to establish a threshold resource consumption rate for both the volatile memory in the second computer and the local hard drive in the first computer, wherein the threshold resource consumption rate sets a maximum permissible level of ancillary resources used to access the volatile memory in the second computer or the local hard drive in the first computer;

program instructions to further select the volatile memory in the second computer or the local hard drive in the first computer to store the data item according to whether the volatile memory in the second computer or the local hard drive in the first computer has a lower threshold resource consumption rate relative to one another; and program instructions to, in response to determining that a volatile memory in a third computer has a lower access time than the volatile memory in the second computer or the local hard drive in the first computer, move the data item from the volatile memory in the second computer to the volatile memory in the third computer.

2. The computer system of claim 1 further comprising:
program instructions to determine that the volatile memory in the second computer does not comport with the isolation rule due to incompatible data being stored in the volatile memory in the second computer, wherein the incompatible data is sensitive data from two different companies;

program instructions to determine that the data item has a higher priority for being accessed by the first computer than the incompatible data that is currently stored in the volatile memory in the second computer; and program instructions to move the incompatible data to a hard drive on the second computer and storing the data item in the volatile memory in the second computer.

3. The computer system of claim 1, wherein the first computer and the second computer are in a cloud computing environment.

4. The computer system of claim 1, further comprising:
program instructions to dynamically adjust the threshold resource consumption rate according to a higher fee associated with the ancillary resources associated with either the volatile memory in the second computer or the local hard drive in the first computer.

5. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to detect a request from a first computer to store a data item;

program instructions to determine if a volatile memory in a second computer comports with an isolation rule for the data item, wherein the isolation rule prohibits sensitive data from two companies co-residing on the volatile memory, wherein comporting with the isolation rule permits the data item to be stored in the volatile memory in the second computer;

program instructions to determine that the volatile memory in the second computer does not comport with the isolation rule due to incompatible data being stored in the volatile memory in the second computer, wherein the incompatible data is sensitive data from two different companies;

program instructions to determine that the data item has a higher priority for being accessed by the first computer than the incompatible data that is currently stored in the volatile memory in the second computer;

program instructions to move the incompatible data to a hard drive on the second computer and storing the data item in the volatile memory in the second computer;

program instructions to selectively store the data item in a storage location that has a lower access time, wherein the storage location is either the volatile memory in the second computer or the local hard drive in the first computer as determined by the lower access time;

program instructions to establish a threshold resource consumption rate for both the volatile memory in the second computer and the local hard drive in the first computer, wherein the threshold resource consumption rate sets a maximum permissible level of ancillary resources used to access the volatile memory in the second computer or the local hard drive in the first computer;

program instructions to further select the volatile memory in the second computer or the local hard drive in the first computer to store the data item according to whether the volatile memory in the second computer or the local hard drive in the first computer has a lower threshold resource consumption rate relative to one another; and program instructions to, in response to determining that a volatile memory in a third computer has a lower access time than the volatile memory in the second computer or the local hard drive in the first computer, move the data item from the volatile memory in the second computer to the volatile memory in the third computer.

6. The computer system of claim 5, wherein the first computer and the second computer are in a cloud computing environment.

7. The computer system of claim 5, further comprising:
program instructions to dynamically adjust the threshold resource consumption rate according to a higher fee associated with the ancillary resources associated with either the volatile memory in the second computer or the local hard drive in the first computer.

8. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
program instructions to detect a request from a first computer to store a data item;
program instructions to determine if a volatile memory in a second computer comports with an isolation rule for the data item, wherein the isolation rule prohibits sensitive data from two companies co-residing on the volatile memory, wherein comporting with the isolation rule permits the data item to be stored in the volatile memory in the second computer;
program instructions to, in response to determining that the volatile memory in the second computer comports with the isolation rule for the data item, compare access time for data in the volatile memory in the second computer with access time for data in a local hard drive in the first computer;
program instructions to selectively store the data item in a storage location that has a lower access time, wherein the storage location is either the volatile memory in the second computer or the local hard drive in the first computer as determined by the lower access time;
program instructions to establish a threshold resource consumption rate for both the volatile memory in the second computer and the local hard drive in the first computer, wherein the threshold resource consumption rate sets a maximum permissible level of ancillary resources used to access the volatile memory in the second computer or the local hard drive in the first computer; and
program instructions to further select the volatile memory in the second computer or the local hard drive in the first computer to store the data item according to whether the volatile memory in the second computer or the local hard drive in the first computer has a lower threshold resource consumption rate relative to one another, wherein the volatile memory in the second computer requires transport overhead associated with using a network channel to transport the data item from the first computer and the second computer, wherein the local hard drive requires only local bus overhead associated with using a local bus in the first computer to store the data item on the local hard drive, and wherein the transport overhead is greater than the local bus overhead.

* * * * *